United States Patent
Hornung

[11] Patent Number: 5,957,467
[45] Date of Patent: Sep. 28, 1999

[54] CLAMPING CHUCK

[75] Inventor: Karl Hornung, Uhingen, Germany

[73] Assignee: Eugen Fahrion GmbH & co., Kaisersbach, Germany

[21] Appl. No.: 08/977,370

[22] Filed: Nov. 24, 1997

[51] Int. Cl.[6] .................................................. B23B 5/22
[52] U.S. Cl. .............................. 279/49; 279/51; 279/54; 279/58; 279/155
[58] Field of Search .................. 279/51, 54, 58, 279/49, 155, 50; 409/234

[56] References Cited

U.S. PATENT DOCUMENTS

| | | | |
|---|---|---|---|
| 4,298,208 | 11/1981 | Benjamin et al. | 279/155 |
| 4,573,824 | 3/1986 | Ehle . | |

FOREIGN PATENT DOCUMENTS

| | | |
|---|---|---|
| 3616230C2 | 6/1990 | Germany . |
| 3938689A1 | 5/1991 | Germany . |
| 4221735A1 | 3/1993 | Germany . |

*Primary Examiner*—Andrea L. Pitts
*Assistant Examiner*—Monica Smith
*Attorney, Agent, or Firm*—Jones, Tullar & Cooper, P.C.

[57] ABSTRACT

A clamping chuck with a chuck body, a conical receptacle for a collet chuck provided therein, a tension sleeve extending over the collet chuck, and a clamping nut disposed on the chuck body, which can be screwed together with the tension sleeve, wherein a bore, with which openings (12a,) in the clamping nut are aligned, radially extends through the chuck body, and wherein clamping pieces are radially displaceable in the bore.

23 Claims, 3 Drawing Sheets

CLAMPING CHUCK

BACKGROUND OF THE INVENTION

The present invention relates to a clamping chuck, such as is customarily connected with a rotary-driven spindle of a machine tool, and to a clamping chuck with receives a collet chuck. The collet chuck in turn holds a tool, for example a drill.

The known clamping chucks display certain asymmetries in their structure regarding the axis of rotation, in particular in that mostly a so-called "eccentric" is provided which engages a groove of the collet chuck for loosening the collet chuck, so that with the help of the eccentric the collet chuck cannot be loosened from its clamping with the clamping chuck. It is not possible to loosen the collet chuck without such an eccentric or corresponding pressure means gripping behind the collet chuck at a place along its circumference.

Such asymmetric components of a clamping chuck have the serious disadvantage that they cause an imbalance. This imbalance leads to vibrations at certain rpm. This results in a poor surface and impairs the service life of the tool. Furthermore, with the known systems the collet chuck is torsionally stressed, because on the one hand it is already clamped in a conical receptacle and, on the other hand, the adjusting nut places a torque on the collet chuck because of friction during clamping. Further concentricity errors are prevented by means of this.

SUMMARY OF THE INVENTION

On the other hand, relatively great progress has already been made in producing collet chucks of highly accurate concentricity, so that an object of the present invention is to also make available clamping chucks of correspondingly highly accurate concentricity.

In accordance with the present invention, the clamping chuck has a chuck body, a conical receptacle provided therein for a collet chuck, a tension sleeve extending over the collet chuck, and a clamping nut disposed on the chuck body, which can be screwed together with the tension sleeve. In this case a bore radially extends through the chuck body, with which openings in the clamping nut are aligned. Clamping pieces can be radially displaced in the bore which, when displaced, cause the clamping of the collet chuck and the expulsion of an ejector sleeve, which is axially displaceable in the chuck body and acts on the tool.

Thus, the arrangement of the clamping pieces is essential, wherein they can be radially displaced away from each other (outward) or toward each other (inward) and, in the course of the outward displacement, clamp the collet chuck and therefore the tool in the collet chuck by acting on the clamping nut and, when displaced in the other direction, exert a pressure on the ejector sleeve, which loosens the collet chuck from a conical receptacle in the chuck body. The system is dynamically completely balanced, so that there is no structurally caused imbalance. Clamping of the collet chuck takes place, free of torsion, only in the axial direction.

BRIEF DESCRIPTION OF THE DRAWINGS

An exemplary embodiment of the present invention and its advantageous further developments will be described in more detail in what follows by means of the attached drawings. Shown are.

DESCRIPTION OF THE PREFERRED EMBODIMENT

Figure 1:
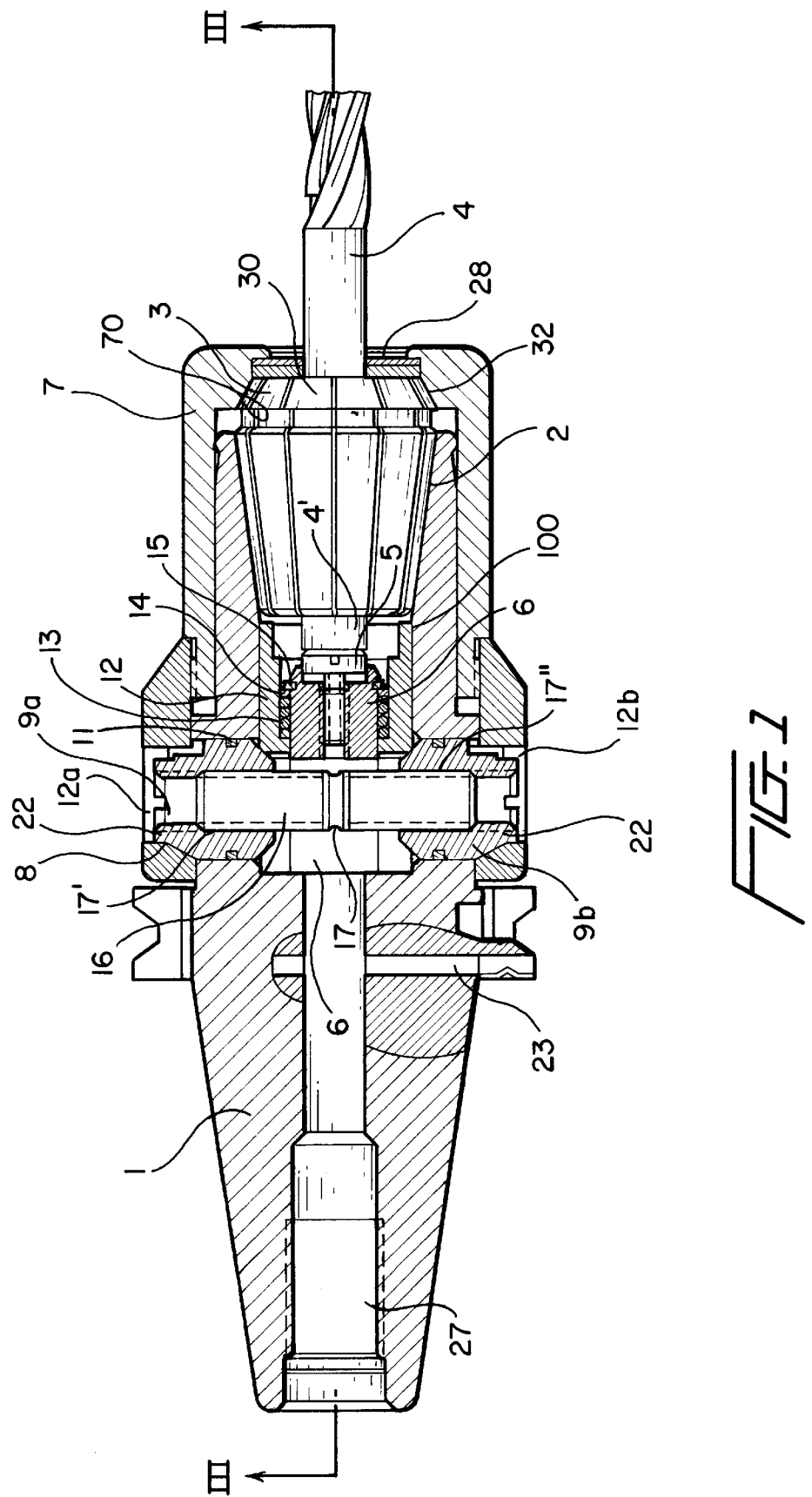
FIG. 1, which is a section through an exemplary embodiment.
Figure 2:
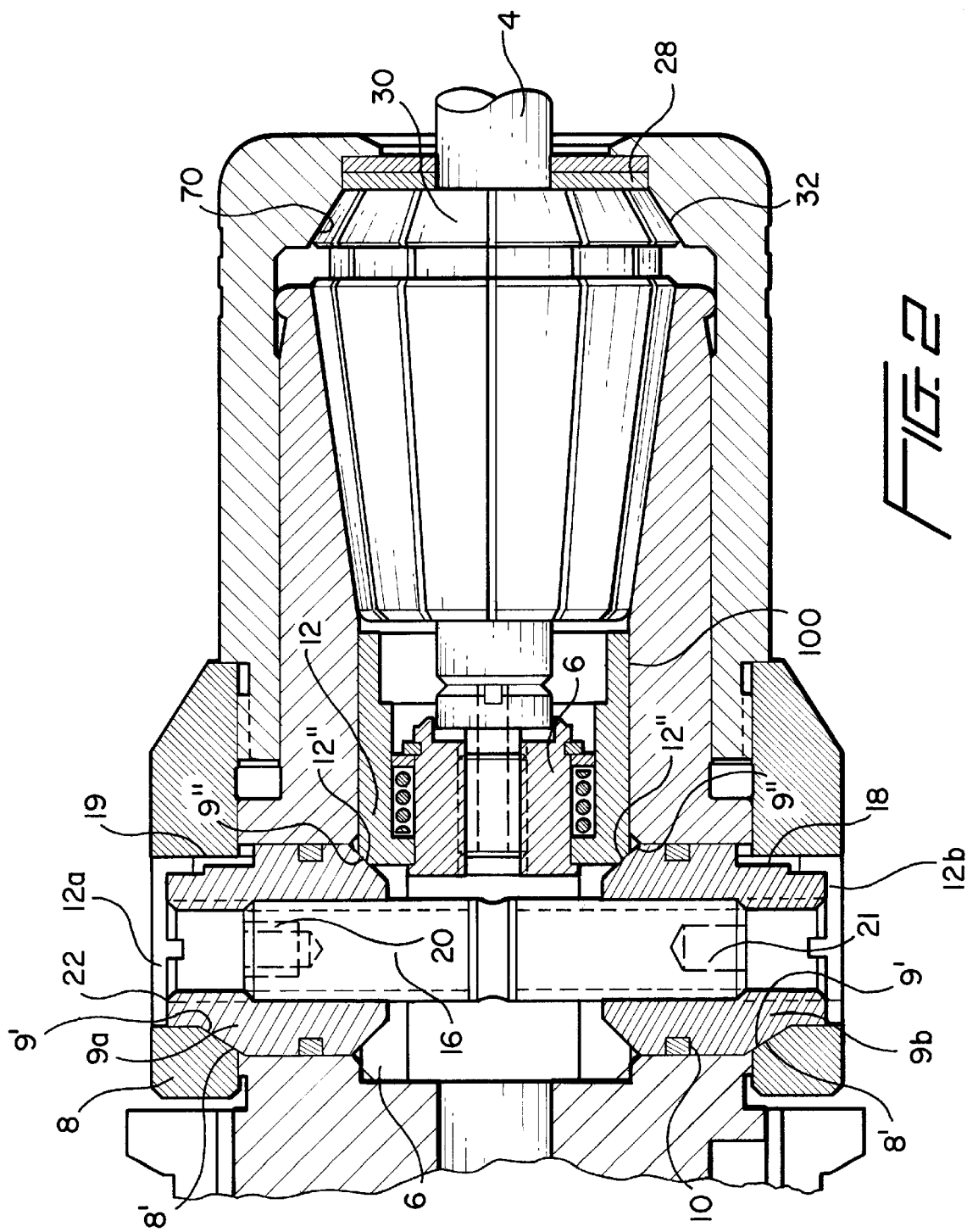
FIG. 2, which is an enlarged representation of the center area of FIG. 1.

The clamping chuck comprises a chuck body 1, which has a conical receptacle 2 on its right side, in which a collet chuck 3 is received. The conicity is, for example, 8°. A tool 4 is received in the collet chuck 3. The tool 4 (for example a milling cutter) rests with its left end 4' against the contact element 5, which comprises a screw. The latter is screwed into a detent 6, which is screwed together with the chuck body 1 by means of screws 24a, 24b (see FIG. 3).

The collet chuck 3 is maintained in the conical receptacle 2 by a tension sleeve 7 and is pushed by it into the conical receptacle 2. For this purpose, the collet chuck 3 has a front end 30 which defines an inclined surface 32, while the tension sleeve 7 defines an inclined surface 70 which engages the inclined surface 32. The tension sleeve 7 is screwed into a clamping nut 8. The clamping nut 8 is held in the axial direction, in that the inclined surfaces 8' provided on the clamping nut 8 push against inclined surfaces 9' of two clamping pieces 9a and 9b. The clamping pieces 9a and 9b are arranged in a bore 10 in the chuck body 1 and are sealed there by means of O-rings 11. The inclined surfaces 8' of the clamping nut 8 are a part of openings 12a and 12b in the clamping nut 8. It follows from their action together that, when the clamping pieces 9a, 9b are moved inward in the radial direction, the clamping nut 8 can move to the right in the radial direction. But when the clamping pieces 9a, 9b are moved radially outward, they displace the clamping nut 8 toward the left in the axial direction. From this it follows: if in a defined position of the clamping pieces 9a, 9b the tension sleeve 7 is rigidly screwed together with the clamping nut 8, or if the clamping pieces 9a, 9b are moved radially outward, the collet chuck 3 is thereby drawn into the conical receptacle 2 and the tool is clamped. If then the clamping pieces 9a, 9b are moved radially inward toward each other, the unit formed by the clamping nut 8 and the tension sleeve 7 can be axially displaced to the right, so that the collet chuck 3 can be pushed a little bit toward the right out of the conical receptacle 2.

The two clamping pieces 9a and 9b have further inclined surfaces 9", which act together with inclined surfaces 12" of the ejector 12. The ejector is seated on a shoulder of the detent 6 and is pressed against it by a pressure spring 13. The other end of the pressure spring 13 is supported on a washer 14 being held by a locking ring 15 which in turn is fastened on the detent 6. In this manner a displacement of the clamping pieces 9a, 9b in the radial direction toward the interior causes a displacement of the ejector 12 to the right in the axial direction. An only slight displacement of this type pushes the collet chuck 3 out of its clamping condition in the conical receptacle 2, so that the collet chuck 3 is loosened and the tool 4 can be taken out and exchanged.

In order to be able to cause the radial displacement of the clamping pieces 9a, 9b toward each other in the bore 10 (loosening the clamping nut 8 and pushing the ejector sleeve 12 to the right) and away from each other (tightening the clamping nut 8), the clamping pieces 9a, 9b are respectively provided with an interior thread, namely the clamping piece 9a with a right-hand thread and the clamping piece 9b with a left-hand thread. A clamping bolt 16 engages these interior threads and is also respectively provided with a thread on both sides of an undercut 17, namely with the right-hand thread 17' and the left-hand thread 17". Thus, if the clamping bolt 16 is rotated in the one direction, the clamping pieces 9a, 9b will be moved toward each other inward in the radial direction as a result of the different opposed threads; if the clamping bolt 16 is rotated in the other direction, the two clamping pieces 9a, 9b are moved away from each other outward in the radial direction. Therefore, in the first case the engagement of the inclined surfaces 8', 9' and therefore the clamping nut 8, and with it the tension sleeve 7, are loosened; simultaneously the ejector sleeve 6 is slightly displaced to the right in the axial direction because of the cooperation of the surfaces 9" and 12" and is thereby "ejected", so that a tool exchange is made possible. The clamping pieces 9a, 9b are moved outward by means of an opposite rotation of the clamping bolt 16. The tension sleeve 7 and the clamping nut 8, and with them also the collet chuck 3, are clamped by the cooperation of the inclined surfaces 8', 9'. The undercut 17 is used to provide a path for the coolants past the clamping bolt 16.

To prevent twisting of the clamping pieces 9a, 9b in the bore 10 and in the openings 12a and 12b of the clamping nut 8, the clamping pieces 9a, 9b are flattened at 18 along their exterior conical circumference constituting the incline 8. The openings 12a and 12b in the clamping nut 8 also correspondingly have flat areas 19 there. A co-rotation of the clamping pieces 9a, 9b when the clamping bolt 16 is rotated is prevented by the flattened places 18, 19 resting against each other.

Rotation of the clamping bolt 16 is provided by means of the insertion of a socket wrench into the hexagon socket 20, to which a compensating bore 21 on the other side corresponds for compensating the mass. The notches 22 on the clamping pieces 9a, 9b are used for adjusting.

For amplification it should be stated that the detent 6 is embodied to be U-shaped in its left area (see also FIG. 3), and extends with the two legs of the U over the clamping bolt 16. The arrangement of the detent sleeve 6 and the ejector sleeve 12 is provided in a bore 100 of the chuck body 1.

On its left end, the chuck body 1 has a bore 27 with an interior thread, which is provided for a clamping bolt in a machine tool. A coolant supply conduit 28 is provided.

Figure 3:
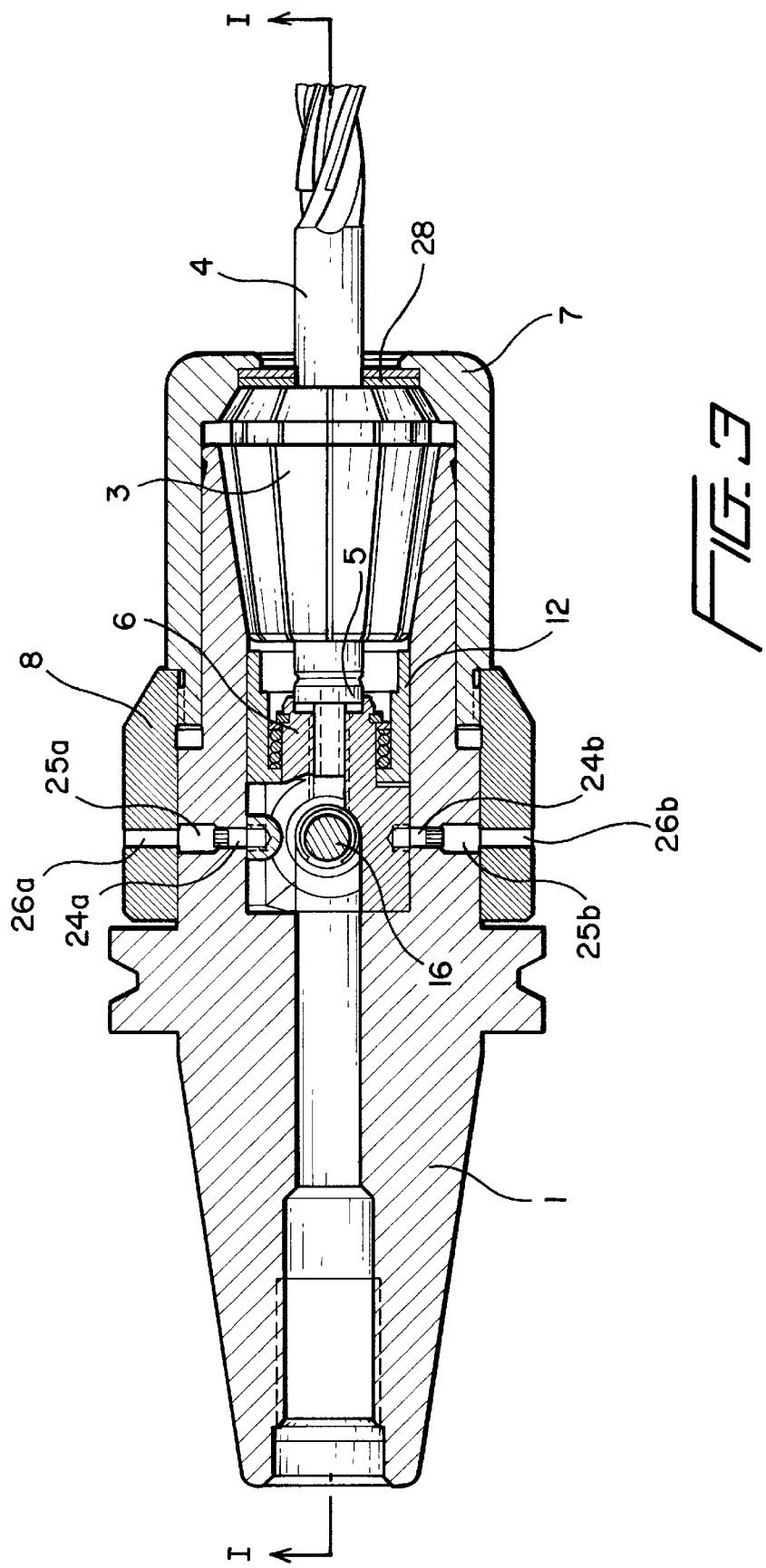
FIG. 3, which is a section along the line III—III in FIG. 1, but with the tool not inserted.

It can be seen from FIG. 3 that the clamping sleeve 6 is maintained in the chuck body 1 by two screws 24a, 24b, which are accessible through bores 25a, 25b in the chuck body 1 and through bores 26a, 26b in the clamping nut 8, which are aligned with them.

For mounting, the clamping pieces 9a and 9b are screwed on the clamping bolt 16 and are then inserted into the bore 10. In the course of this the clamping pieces 9a, 9b must be screwed on the clamping bolt 10 sufficiently far toward the interior so that it is possible to push the clamping nut 8 from the outside over the chuck body into the position shown in FIG. 1. Then the detent 6 with the detent element 5 and the pre-assembled ejector 12 is inserted from the right and fixed in place with the aid of the screws 24a and 24b. Then the tension sleeve 7 is screwed together with the clamping nut 8. Then, with the tool 4 inserted, the clamping bolt 16 is rotated by turning a hexagon key inserted at 20 in such a way, that the clamping pieces 9a, 9b move radially outward sufficiently far so that, on the one hand, the ejector 12 is located in its represented end position and, on the other hand, the collet chuck 3 is clamped by tightening the tension sleeve 7 and the clamping nut 8.

In order to be able to remove the tool 4 again, or respectively to replace it, it is sufficient to rotate the clamping bolt 16 by up to one and a half turns from the outside through the openings 12a, 12b by inserting a hexagon wrench into the hexagon socket 20. As described, the tension sleeve 7 is then loosened. Simultaneously, by the cooperation of the inclined surfaces 9", 12", the ejector 12 is axially displaced to the right sufficiently far, so that its right end pushes the collet chuck 3 out of its rigid clamping conduction at the conical receptacle 2.

It can be seen from the description given, that the entire structure no longer shows asymmetries, so that with the appropriate precise working of all parts, vibration-free running is assured.

The entire system is suitable for interior cooling. The coolant is introduced through the coolant conduit 23 into the bore 27 and, passing around the undercut 17, it gets through an interior bore in the detent element 5 through an interior conduit in the tool 4, provided such has been arranged. For sealing, the tension sleeve is provided with the inserted seal 28. Sealing at the clamping pieces is performed by means of the already mentioned O-rings 11.

I claim:

1. A clamping chuck, comprising:
    a chuck body having a substantially radially extending bore;
    a receptacle mounted to said chuck body and having a conically shaped portion;
    a collet chuck received within said conically shaped portion;
    a clamping nut disposed on said chuck body, said clamping nut having screw threads and a pair of openings aligned with said bore;
    a tension sleeve extending over said collet chuck, said tension sleeve having screw threads which engage with the screw threads of said clamping nut;
    clamping pieces disposed in said bore for displacement toward each other and away from each other; and
    an ejector mounted in said chuck body for engagement with said collet chuck and said clamping pieces,
    wherein when said clamping pieces are displaced in one direction relative to each other said tension sleeve and clamping nut are clamped together, and when said clamping pieces are displaced in the opposite direction relative to each other said ejector is axially displaced against said collet chuck to move said collet chuck in a direction away from said bore.

2. The clamping chuck as defined in claim 1, wherein said clamping pieces include inclined surfaces and said clamping nut includes an inclined surface, and wherein said inclined surfaces cooperating such that said tension sleeve and said clamping nut act together so that said collet chuck is clamped by said tension sleeve in said conically shaped portion.

3. The clamping chuck as defined in claim 1, wherein said chuck body has an axially extending bore in which said ejector is disposed, said ejector having an inclined surface, wherein said clamping pieces include further inclined surfaces which cooperate with said inclined surfaces of said ejector so that movement of said clamping pieces toward each other causes said ejector to move in said axial bore.

4. The clamping chuck as defined in claim 3, further comprising:
    a pressure spring, and a detent situated in said axial bore, said pressure spring acting on said detent for displacement in said bore.

5. The clamping chuck as defined in claim 4, wherein said detent acts as a detent for a tool inserted in said collet chuck.

6. The clamping chuck as defined in claim 5, further comprising:

a screw received in said detent for receiving the tool.

7. The clamping chuck as defined in claim 1, further comprising:

a clamping bolt having exterior threads thereon, wherein said clamping pieces each define a bore having a thread therein, and wherein said clamping bolt is received in the bores of said clamping pieces such that its exterior threads engage the threads of said clamping pieces.

8. The clamping chuck as defined in claim 7, wherein said clamping bolt has an undercut for permitting the passage of coolant, said undercut being situated between the thread engaging each clamping piece.

9. The clamping chuck as defined in claim 7, wherein the threads in one of said clamping pieces are right-hand threads and the threads in said other clamping piece are left-hand threads.

10. A balanced clamping chuck, comprising:

a chuck body having a substantially radially extending bore;

a receptacle mounted to said chuck body and having a conically shaped portion;

a collet chuck received within said conically shaped portion;

a clamping nut disposed on said chuck body, said clamping nut having screw threads and a pair of openings aligned with said bore;

a tension sleeve extending over said collet chuck, said tension sleeve having screw threads which engage with the screw threads of said clamping nut;

clamping pieces disposed in said bore for displacement toward each other and away from each other; and an ejector mounted in said chuck body for engagement with said collet chuck and said clamping pieces, wherein when said clamping pieces are displaced in one direction relative to each other said tension sleeve and clamping nut are clamped together, and when said clamping pieces are displaced in the opposite direction relative to each other said ejector is axially displaced against said collet chuck to move said collet chuck in a direction away from said bore.

11. The clamping chuck as defined in claim 1, wherein said collet chuck has a front end which extends outwardly from said receptacle, and wherein said tension sleeve engages said front end.

12. The clamping chuck as defined in claim 11, wherein said front end defines an inclined surface and said tension sleeve defines an inclined surface which engages the inclined surface of said front end.

13. The balanced clamping chuck as defined in claim 10, wherein said collet chuck has a front end which extends outwardly from said receptacle, and wherein said tension sleeve engages said front end.

14. The balanced clamping chuck as defined in claim 13, wherein said front end defines an inclined surface and said tension sleeve defines an inclined surface which engages the inclined surface of aid front end.

15. A clamping chuck, comprising:

a chuck body having a substantially radially extending bore;

a receptacle mounted to said chuck body and having a conically shaped portion;

a collet chuck received within said conically shaped portion;

a clamping nut disposed on said chuck body, said clamping nut having screw threads and a pair of openings aligned with said bore;

a tension sleeve extending over said receptacle, said tension sleeve engaging said collet chuck and having screw threads which engage with the screw threads of said clamping nut;

clamping pieces disposed in said bore for displacement toward each other and away from each other; and an ejector mounted in said chuck body for engagement with said collet chuck and said clamping pieces, wherein when said clamping pieces are displaced in one direction relative to each other said tension sleeve and clamping nut are clamped together, and when said clamping pieces are displaced in the opposite direction relative to each other said ejector is axially displaced against said collet chuck to move said collet chuck in a direction away from said bore.

16. The clamping chuck as defined in claim 15, wherein said clamping pieces include inclined surfaces and said clamping nut includes an inclined surface, and wherein said inclined surfaces cooperating such that said tension sleeve and said clamping nut act together so that said collet chuck is clamped by said tension sleeve in said conically shaped portion.

17. The clamping chuck as defined in claim 15, wherein said chuck body has an axially extending bore in which said ejector is disposed, said ejector having an inclined surface, wherein said clamping pieces include further inclined surfaces which cooperate with said inclined surfaces of said ejector so that movement of said clamping pieces toward each other causes said ejector to move in said axial bore.

18. The clamping chuck as defined in claim 17, further comprising:

a pressure spring, and a detent situated in said axial bore, said pressure spring acting on said detent for displacement in said bore.

19. The clamping chuck as defined in claim 18, wherein said detent acts as a detent for a tool inserted in said collet chuck.

20. The clamping chuck as defined in claim 19, further comprising:

a screw received in said detent for receiving the tool.

21. The clamping chuck as defined in claim 15, further comprising:

a clamping bolt having exterior threads thereon, wherein said clamping pieces each define a bore having a thread therein, and wherein said clamping bolt is received in the bores of said clamping pieces such that its exterior threads engage the threads of said clamping pieces.

22. The clamping chuck as defined in claim 21, wherein said clamping bolt has an undercut for permitting the passage of coolant, said undercut being situated between the thread engaging each clamping piece.

23. The clamping chuck as defined in claim 21, wherein the threads in one of said clamping pieces are right-hand threads and the threads in said other clamping piece are left-hand.

* * * * *